UNITED STATES PATENT OFFICE.

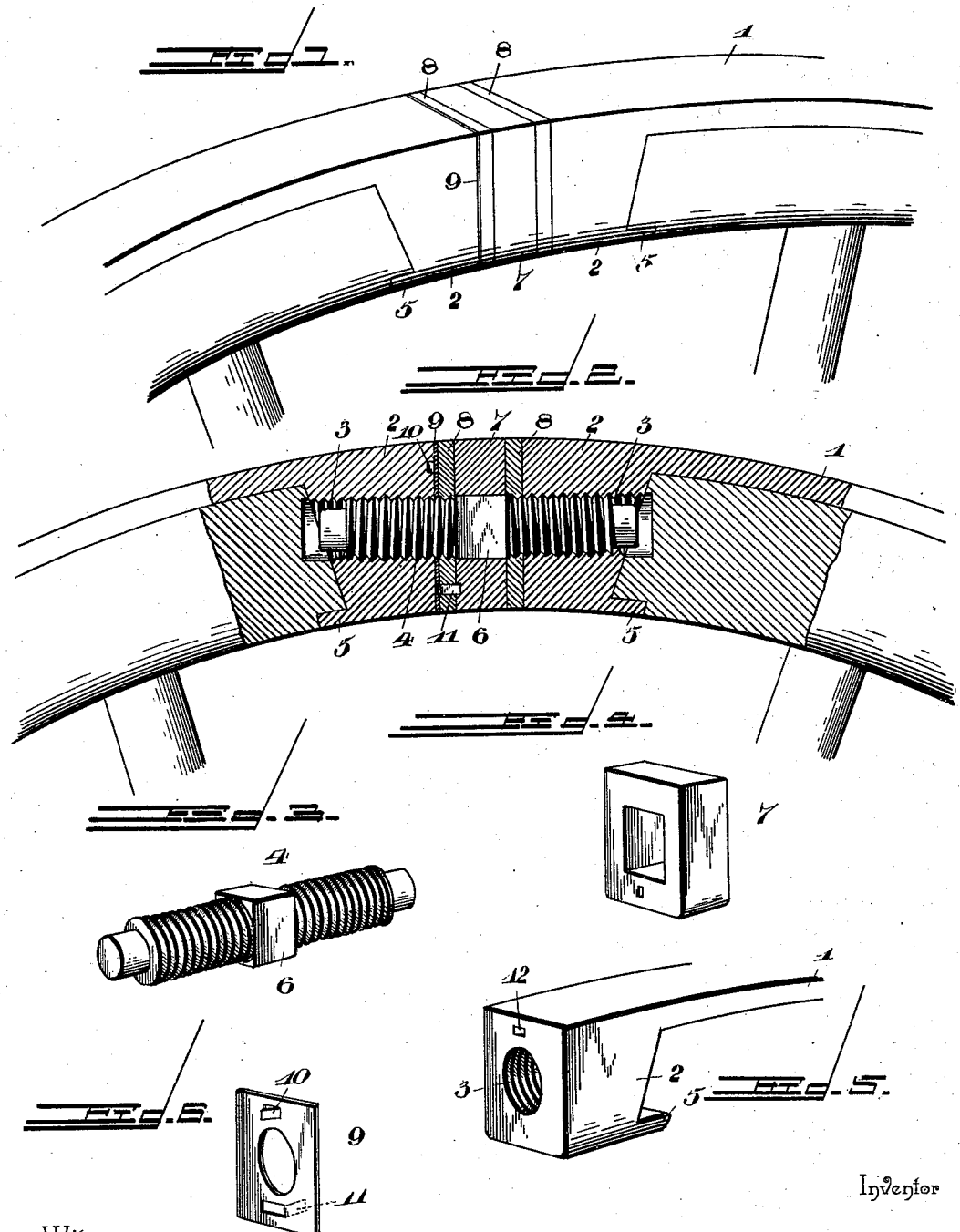

HENRY REMBERT, OF GALVESTON, TEXAS.

TIRE-TIGHTENER.

SPECIFICATION forming part of Letters Patent No. 578,525, dated March 9, 1897.

Application filed May 22, 1896. Serial No. 592,663. (No model.)

*To all whom it may concern:*

Be it known that I, HENRY REMBERT, a citizen of the United States, residing at Galveston, in the county of Galveston and State of Texas, have invented a new and useful Tire-Tightener, of which the following is a specification.

The invention relates to improvements in tire-tighteners.

The object of the present invention is to improve the construction of tire-tighteners and to provide a simple, inexpensive, and efficient device capable of ready adjustment to contract and expand a tire, to permit the tire to be tightened when a wheel becomes loose in dry weather, and to expand in wet weather to prevent the same from becoming dished.

The invention consists in the construction and novel combination and arrangement of parts hereinafter fully described, illustrated in the accompanying drawings, and pointed out in the claim hereto appended.

In the drawings, Figure 1 is a perspective view of a portion of a wheel provided with a tire-tightener constructed in accordance with this invention. Fig. 2 is a central longitudinal sectional view. Fig. 3 is a detail perspective view of the adjusting-screw. Fig. 4 is a similar view of the spacing-block. Fig. 5 is a detail perspective view of one of the end lugs of the tire. Fig. 6 is a detail perspective view of the locking-plate.

Like numerals of reference designate corresponding parts in all the figures of the drawings.

1 designates a tire provided at its ends with lugs 2, preferably welded to the tire, and provided with threaded openings 3, and the latter are provided with right and left hand threads for the reception of a right and left hand threaded adjusting-screw 4, which are adapted to draw the lugs together or to separate the same, to contract or expand the tire, to tighten the parts of the wheel in dry weather, and permit the parts of the wheel to expand in wet weather to prevent the wheel from becoming dished. The lugs 2, which extend inward from the ends of the tire, abut against the adjacent ends of the fellies and are provided with longitudinally-disposed flanges 5, supporting the fellies and arranged at the inner faces thereof.

The adjusting-screw is provided with a central, squared, or polygonal portion 6, receiving a central spacing-block 7, which is provided with a rectangular opening to receive the square portion of the adjusting-screw. The spacing-block covers the square portion of the adjusting-screw and is rectangular, its outer edge being flush with the adjacent faces of the tire and its inner and side edges being flush with the corresponding faces of the lugs 2.

The adjusting-screw is adapted to be rotated by turning the central spacing-block, and one or more washers 8 may be arranged at each side of the central spacing-block to fill the spaces between the same and the lugs of the tire.

The washers 8 may be constructed of any suitable material, such as leather, paper, metal, or the like, and the adjusting-screw is secured against accidental movement by a rectangular locking-plate 9, conforming to the configuration of the adjacent lug 2 and provided with oppositely-disposed integral tongues 10 and 11. The tongues are struck up out of the metal of the locking-plate, the tongue 10 engages a recess 12 of the adjacent lug 2, and the other tongue passes through the adjacent washer 8 and engages a recess 13 of the central spacing-block 7. The tongue 11, which engages the recess 13 of the spacing-block 7, is disposed at an angle, and when the adjusting-screw is rotated forward to tighten the parts the recess 13 readily passes the tongue 11, but the latter is adapted to engage the recess to prevent any retrograde movement of the screw, which can be rotated backward only through the force exerted by a wrench.

It will be seen that the tire-tightener is exceedingly simple and inexpensive in construction, that it is capable of ready adjustment, and that it will permit a tire to be constructed or expanded to tighten the parts of a wheel or to enable the same to expand to prevent it from becoming dished. It will also be seen that it will enable a tire to be readily removed from a wheel to permit a broken spoke to be readily replaced by a new one.

Changes in the form, proportion, and minor details of construction may be resorted to without departing from the principle or sacrificing any of the advantages of this invention.

What I claim is—

In a device of the class described, the combination of a tire provided at its ends with inwardly-extending lugs having threaded openings, one of the lugs being provided with a recess, an adjusting-screw engaging the threaded openings of the lugs and connecting the ends of the tire, a spacing-block mounted on the adjusting-screw and provided at one side with a recess, washers arranged at opposite sides of the spacing-block, and a locking-plate constructed of metal and arranged contiguous to one of said lugs, said locking-plate being provided with oppositely-extending tongues 10 and 11 struck up from the metal of the plate, the tongue 10 engaging the recess of the tire and the other tongue 11 extending through the adjacent washer and engaging the recess of the spacing-block, whereby the adjusting-screw is locked against retrograde rotation, substantially as described.

In testimony that I claim the foregoing as my own I have hereto affixed my signature in the presence of two witnesses.

HENRY REMBERT.

Witnesses:
H. P. MOOR,
W. J. B. MOOR.